US008548625B2

(12) United States Patent
Whitten et al.

(10) Patent No.: US 8,548,625 B2
(45) **Date of Patent: *Oct. 1, 2013**

(54) OPTICAL VEND SENSING SYSTEM FOR PRODUCT DELIVERY DETECTION

(75) Inventors: David Boyd Whitten, Saint Charles, MO (US); William Edwin Booth, Saint Louis, MO (US); Paul Kevin Griner, Saint Louis, MO (US); Brian Lee Duncan, Highland, IL (US)

(73) Assignee: Crane Merchandising Systems, Inc., Bridgeton, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/656,908

(22) Filed: Jan. 23, 2007

(65) Prior Publication Data

US 2007/0213871 A1 Sep. 13, 2007

Related U.S. Application Data

(63) Continuation of application No. 10/796,428, filed on Mar. 9, 2004, now Pat. No. 7,191,034, which is a continuation of application No. 09/935,935, filed on Aug. 23, 2001, now Pat. No. 6,732,014.

(51) Int. Cl.
*G06F 17/00* (2006.01)
*H01M 14/00* (2006.01)

(52) U.S. Cl.
USPC ............................ 700/244; 700/236; 700/231

(58) Field of Classification Search
USPC .......................... 700/231–244; 221/1–312 C
See application file for complete search history.

(56) References Cited

U.S. PATENT DOCUMENTS

| | | | |
|---|---|---|---|
| 645,499 | A | 3/1900 | Vogel |
| 1,848,874 | A | 3/1932 | Fitz Gerald |
| 2,571,283 | A | 10/1951 | Nicholson |
| 2,590,736 | A | 3/1952 | Tandler et al. |
| 2,900,521 | A | 7/1953 | Eames |
| 3,025,406 | A | 3/1962 | Stewart |

(Continued)

FOREIGN PATENT DOCUMENTS

| | | |
|---|---|---|
| CA | 2 217 476 C | 2/2006 |
| DE | 43 38 978 A1 | 5/1995 |

(Continued)

OTHER PUBLICATIONS

"Wurlitzer," Deutsche Wurlitzer GmbH, A Division ofNelson Group of Companies, Sydney, Australia, 7 pages.

(Continued)

*Primary Examiner* — Michael K Collins

(57) ABSTRACT

An optical vend sensing system for use in vending machines employs a row of light emitters on one side of a region through which a vend product passes during delivery and a row of light detectors on the opposite side. Each detector is substantially aligned with a corresponding one of the emitters, and is capable of receiving light from any of more than one of the emitters when that emitter is activated. The emitters are individually activated in sequential, round-robin fashion and multiple detectors are monitored for each emitter when activated. Interruption of detectible beams between an activated emitter and one of the multiple emitters monitored for the activated emitter. Power applied to an activated emitter is calibrated in steps to a minimum level sufficient to ensure detection by all monitored detectors of light emitted by an activated emitter, plus a safety margin.

16 Claims, 5 Drawing Sheets

(56) References Cited

U.S. PATENT DOCUMENTS

| | | | | | |
|---|---|---|---|---|---|
| 3,041,462 | A | | 6/1962 | Ogle | |
| 3,235,738 | A | | 2/1966 | Kress et at | |
| 3,461,922 | A | | 8/1969 | Niehaus et at | |
| 3,537,091 | A | | 10/1970 | Schenkenberg | |
| 3,687,255 | A | | 8/1972 | Johnson, II | |
| 3,692,211 | A | | 9/1972 | Flubacker | |
| 3,723,737 | A | | 3/1973 | Zeldman et al. | |
| 3,742,222 | A | | 6/1973 | Endl | |
| 3,746,863 | A | * | 7/1973 | Pronovost | 250/222.1 |
| 3,795,343 | A | | 3/1974 | Shigemori et al. | |
| 3,805,061 | A | * | 4/1974 | De Missimy et al. | 250/208.3 |
| 3,828,903 | A | | 8/1974 | Levasseur | |
| 3,889,118 | A | | 6/1975 | Walker | |
| 3,894,220 | A | | 7/1975 | Levasseur | |
| 3,901,366 | A | | 8/1975 | Schuller et al. | |
| 3,914,579 | A | | 10/1975 | Shigemori et al. | |
| 3,963,035 | A | | 6/1976 | Levasseur | |
| 4,008,792 | A | | 2/1977 | Levasseur et al. | |
| 4,032,039 | A | | 6/1977 | Schuller | |
| 4,033,442 | A | | 7/1977 | Wirstlin et al. | |
| 4,033,477 | A | | 7/1977 | Hoppe et al. | |
| 4,044,877 | A | | 8/1977 | Burton | |
| 4,108,333 | A | * | 8/1978 | Falk et al. | 221/13 |
| 4,127,771 | A | | 11/1978 | Sick | |
| 4,174,742 | A | | 11/1979 | Murphey | |
| 4,231,105 | A | | 10/1980 | Schuller et al. | |
| 4,252,250 | A | * | 2/1981 | Toth | 221/13 |
| 4,266,124 | A | * | 5/1981 | Weber et al. | 250/221 |
| 4,310,756 | A | | 1/1982 | Sick et al. | |
| 4,359,147 | A | | 11/1982 | Levasseur | |
| 4,402,609 | A | | 9/1983 | Fetzer et al. | |
| 4,412,607 | A | | 11/1983 | Collins et al. | |
| 4,429,778 | A | | 2/1984 | Levasseur | |
| 4,478,353 | A | | 10/1984 | Levasseur | |
| 4,480,764 | A | | 11/1984 | Takagi et al. | |
| 4,494,675 | A | | 1/1985 | Stutsman | |
| 4,512,453 | A | | 4/1985 | Schuller et al. | |
| 4,573,606 | A | | 3/1986 | Lewis et al. | |
| 4,590,975 | A | | 5/1986 | Credle, Jr. | |
| 4,608,679 | A | | 8/1986 | Rudy et al. | |
| 4,634,855 | A | | 1/1987 | Friend et al. | |
| 4,696,413 | A | | 9/1987 | Wilson et al. | |
| 4,705,176 | A | | 11/1987 | Oden | |
| 4,730,750 | A | | 3/1988 | Ficken | |
| 4,776,487 | A | | 10/1988 | Kurosawa et al. | |
| 4,854,477 | A | | 8/1989 | Kurosawa et al. | |
| 4,869,392 | A | | 9/1989 | Moulding, Jr. et al. | |
| 4,871,054 | A | | 10/1989 | Murray | |
| 4,888,532 | A | | 12/1989 | Josson | |
| 4,912,316 | A | | 3/1990 | Yamakawa | |
| 5,015,840 | A | | 5/1991 | Blau | |
| 5,026,983 | A | | 6/1991 | Meyn | |
| RE33,668 | E | | 8/1991 | Gray | |
| 5,076,801 | A | | 12/1991 | Schroll | |
| 5,084,845 | A | | 1/1992 | Levasseur | |
| 5,111,962 | A | | 5/1992 | Oden | |
| 5,139,127 | A | | 8/1992 | Ficken et al. | |
| 5,149,921 | A | * | 9/1992 | Picado | 187/317 |
| 5,201,429 | A | | 4/1993 | Hikosaka et al. | |
| 5,207,784 | A | | 5/1993 | Schwartzendruber | |
| 5,218,196 | A | * | 6/1993 | Dogul et al. | 250/221 |
| 5,229,749 | A | | 7/1993 | Yenglin | |
| 5,238,145 | A | | 8/1993 | Pippin | |
| 5,261,467 | A | | 11/1993 | Yamamoto et al. | |
| 5,273,183 | A | | 12/1993 | Tuttobene | |
| 5,276,391 | A | | 1/1994 | Jonsson | |
| 5,280,845 | A | | 1/1994 | Leight | |
| 5,281,809 | A | | 1/1994 | Anderson et al. | |
| 5,303,844 | A | | 4/1994 | Muehlberger | |
| 5,344,043 | A | | 9/1994 | Moulding et al. | |
| 5,346,466 | A | | 9/1994 | Yerlikaya et al. | |
| 5,390,711 | A | | 2/1995 | Murphey | |
| 5,404,008 | A | | 4/1995 | Malinowski et al. | |
| 5,417,233 | A | | 5/1995 | Thomas et al. | |
| 5,490,610 | A | | 2/1996 | Pearson | |
| 5,496,996 | A | | 3/1996 | Barnes et al. | |
| 5,505,332 | A | | 4/1996 | Vogelpohl et al. | |
| 5,577,733 | A | | 11/1996 | Downing | |
| 5,583,334 | A | | 12/1996 | Baumann | |
| 5,625,198 | A | | 4/1997 | Chigira | |
| 5,651,476 | A | | 7/1997 | Percy et al. | |
| 5,651,479 | A | | 7/1997 | Bates | |
| 5,769,269 | A | | 6/1998 | Peters | |
| 5,791,516 | A | | 8/1998 | Wittern, Jr. et al. | |
| 5,813,568 | A | | 9/1998 | Lowing | |
| 5,831,862 | A | | 11/1998 | Hetrick et al. | |
| 5,847,389 | A | | 12/1998 | Mertins et al. | |
| 5,883,383 | A | * | 3/1999 | Dragne | 250/222.2 |
| 5,884,806 | A | | 3/1999 | Boyer et al. | |
| 5,922,030 | A | | 7/1999 | Shank et al. | |
| 5,927,539 | A | | 7/1999 | Truitt et al. | |
| 5,992,030 | A | | 11/1999 | Mann | |
| 6,064,921 | A | | 5/2000 | Pippin et al. | |
| 6,098,524 | A | | 8/2000 | Reese | |
| 6,186,396 | B1 | | 2/2001 | Crandall, Jr. | |
| 6,202,888 | B1 | | 3/2001 | Pollock et al. | |
| 6,269,285 | B1 | | 7/2001 | Mignault | |
| 6,324,520 | B1 | | 11/2001 | Walker et al. | |
| 6,330,958 | B1 | | 12/2001 | Ruskin et al. | |
| 6,354,716 | B1 | | 3/2002 | Chen et al. | |
| 6,384,402 | B1 | | 5/2002 | Hair, III et al. | |
| 6,478,187 | B2 | | 11/2002 | Simson et al. | |
| 6,520,373 | B1 | | 2/2003 | Neely et al. | |
| 6,540,102 | B2 | | 4/2003 | Gates et al. | |
| 6,592,005 | B1 | | 7/2003 | Coughlin et al. | |
| 6,629,625 | B1 | * | 10/2003 | Paczkowski et al. | 221/2 |
| 6,640,994 | B2 | | 11/2003 | Chen | |
| 6,675,985 | B2 | | 1/2004 | Sato et al. | |
| 6,708,079 | B2 | | 3/2004 | Mason, II | |
| 6,732,014 | B2 | * | 5/2004 | Whitten et al. | 700/244 |
| 6,758,370 | B2 | | 7/2004 | Cooke et al. | |
| 6,772,906 | B2 | | 8/2004 | Wittern, Jr. et al. | |
| 6,794,634 | B2 | | 9/2004 | Hair, III et al. | |
| 7,191,034 | B2 | * | 3/2007 | Whitten et al. | 700/244 |
| 7,286,901 | B2 | | 10/2007 | Whitten et al. | |
| 7,980,418 | B2 | | 7/2011 | Whitten et al. | |
| 8,046,100 | B2 | * | 10/2011 | Whitten et al. | 700/236 |
| 2001/0000408 | A1 | * | 4/2001 | Hair et al. | 250/224 |
| 2001/0000610 | A1 | | 5/2001 | Johnson | |
| 2001/0020685 | A1 | * | 9/2001 | Serita | 250/492.1 |
| 2002/0117509 | A1 | | 8/2002 | Whitten et al. | |
| 2002/0179620 | A1 | | 12/2002 | Mason, II | |
| 2002/0195458 | A1 | | 12/2002 | Whitten et al. | |
| 2003/0084959 | A1 | | 5/2003 | Hartnell et al. | |
| 2003/0155367 | A1 | | 8/2003 | Chen | |
| 2004/0172334 | A1 | | 9/2004 | Whitten et al. | |
| 2004/0204791 | A1 | | 10/2004 | Hair, III et al. | |
| 2007/0084872 | A1 | * | 4/2007 | Hair et al. | 221/21 |

FOREIGN PATENT DOCUMENTS

| | | | |
|---|---|---|---|
| DE | 200 06 317 | U1 | 11/2000 |
| EP | 0 053 489 | | 6/1982 |
| EP | 0 063 489 | | 6/1982 |
| EP | 0 071 438 | A2 | 2/1983 |
| EP | 0 432 996 | | 6/1991 |
| EP | 0 462 591 | | 12/1991 |
| EP | 0 535 856 | | 4/1993 |
| EP | 0 572 119 | A2 | 12/1993 |
| EP | 1 180 752 | A2 | 2/2002 |
| GB | 2 170 792 | A | 8/1986 |
| JP | 02-257386 | | 10/1990 |
| JP | H04-52284 | | 5/1992 |
| JP | 07-282347 | | 10/1995 |
| JP | 09-153172 | | 6/1997 |
| JP | 09-326075 | | 12/1997 |
| JP | 10-011639 | | 1/1998 |
| WO | WO 99/38125 | A1 | 7/1999 |
| WO | WO 99/56255 | | 11/1999 |
| WO | WO 99/56255 | A1 | 11/1999 |
| WO | WO 00/74009 | A1 | 12/2000 |
| WO | WO 01/01359 | A1 | 1/2001 |
| WO | WO 01/03087 | A1 | 1/2001 |
| WO | WO 01/29788 | A2 | 4/2001 |
| WO | WO 03/052706 | A1 | 6/2003 |

OTHER PUBLICATIONS

Communication pursuant to Article 94(3) EPC dated Feb. 8, 2008 in European Patent Application No. 02 744 414.0, 5 pages.
Office Action dated Aug. 27, 2008 in connection with U.S. Appl. No. 11/977,099.
Office Action dated Aug. 29, 2008 in connection with U.S. Appl. No. 11/982,330.
Office Action dated Jan. 8, 2009 in connection with U.S. Appl. No. 11/717,594.
Office Action dated Mar. 19, 2009 in connection with U.S. Appl. No. 11/982,330.
Office Action dated Oct. 30, 2009 in connection with U.S. Appl. No. 11/717,594.
Office Action dated Sep. 1, 2009 in connection with U.S. Appl. No. 11/977,099.
Office Action dated Jul. 14, 2009 in connection with U.S. Appl. No. 11/717,594.
Office Action dated Sep. 24, 2009 in connection with U.S. Appl. No. 11/982,330.
Office Action dated Mar. 22, 2010 in connection with U.S. Appl. No. 11/977,099.
Office Action dated May 13, 2010 in connection with U.S. Appl. No. 11/717,594.
European Search Report dated Nov. 16, 2010 in connection with European Patent Application No. 10 18 3519.
"Declaration of Algert J. Maldanis", executed on Dec. 10, 2010, pp. 1-24.
Office Action dated Sep. 21, 2011 in connection with Canadian Patent Application No. 2,489,788.
Office Action dated Mar. 23, 2012 in connection with U.S. Appl. No. 13/185,034.
Office Action dated Dec. 9, 2010 in connection with Canadian Patent Application No. 2,489,788.
Office Action dated Dec. 17, 2010 in connection with U.S. Appl. No. 11/717,594.
Office Action dated Nov. 14, 2011 in connection with U.S. Appl. No. 13/185,034.
"Wurlitzer," Deutsche Wurlitzer GmbH, A Division of Nelson Group of Companies, Sydney, Australia, 7 pages.
"NAIS," Worldwide Matsushita Brand, 3 pages.
"SUNX," 1996 Condensed, 2 pages.
Office Action dated Jun. 7, 2013 in connection with U.S. Appl. No. 13/185,034.

* cited by examiner

OPTICAL VEND SENSING SYSTEM FOR PRODUCT DELIVERY DETECTION

This application is a continuation of U.S. patent application Ser. No. 10/796,428, allowed, filed Mar. 9, 2004 and entitled "METHOD AND SYSTEM FOR ACCOMPLISHING PRODUCT DETECTION," now U.S. Pat. No. 7,191,034 which is a continuation of Ser. No. 09/935,935 filed Aug. 23, 2001 also entitled "METHOD AND SYSTEM FOR ACCOMPLISHING PRODUCT DETECTION," now U.S. Pat. No. 6,732,014. This utility application also claims priority through the above-identified applications to U.S. Provisional Patent Application Ser. No. 60/271,998, filed Feb. 27, 2001 and entitled "METHOD AND SYSTEM FOR ACCOMPLISHING PRODUCT DETECTION," the content of which is incorporated herein by reference. This application includes subject matter protected by copyright.

BACKGROUND OF THE INVENTION

1. Technical Field

The present invention relates to the vending arts generally and more specifically to vending machine delivery systems for determining whether a product has actually been delivered to the consumer after a customer order.

2. Description of the Prior Art

Many vending machines lack the ability to detect and confirm whether an ordered product has been actually delivered to a customer after an ordered vend event by the customer has occurred. A common type of vending machine, referred to herein as "home switch" systems, always assume that the ordered product is available for delivery and that the product is successfully delivered upon completing one vend cycle.

However, such vending machines often fail to deliver the product after the vend cycle for various reasons, including improper installation of the products by the vendor's sales representative or obstructions in the delivery path. Thus, presently in such systems, after paying for the product and a vend cycle occurring, the customer fails to receive the ordered product, resulting in the customer becoming frustrated with the vending company, affecting customer relations and vending sales.

BRIEF SUMMARY OF THE INVENTION

An optical vend sensing system for use in vending machines employs a row of light emitters on one side of a region through which a vend product passes during delivery and a row of light detectors on the opposite side. Each detector is substantially aligned with a corresponding one of the emitters, and is capable of receiving light from any of more than one of the emitters when that emitter is activated. The emitters are individually activated in sequential, round-robin fashion and multiple detectors are monitored for each emitter when activated. Interruption of detectible beams between an activated emitter and one of the multiple emitters monitored for the activated emitter. Power applied to an activated emitter is calibrated in steps to a minimum level sufficient to ensure detection by all monitored detectors of light emitted by an activated emitter, plus a safety margin.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following DETAILED DESCRIPTION OF THE INVENTION.

DETAILED DESCRIPTION

The present invention is a vending system that verifies that an actual delivery of an ordered product is made. If the actual delivery fails for a set number of delivery attempts, then the customer is offered one or more alternative choices, including without limitation, choosing an alternative product, or a refund.

Figure 1:
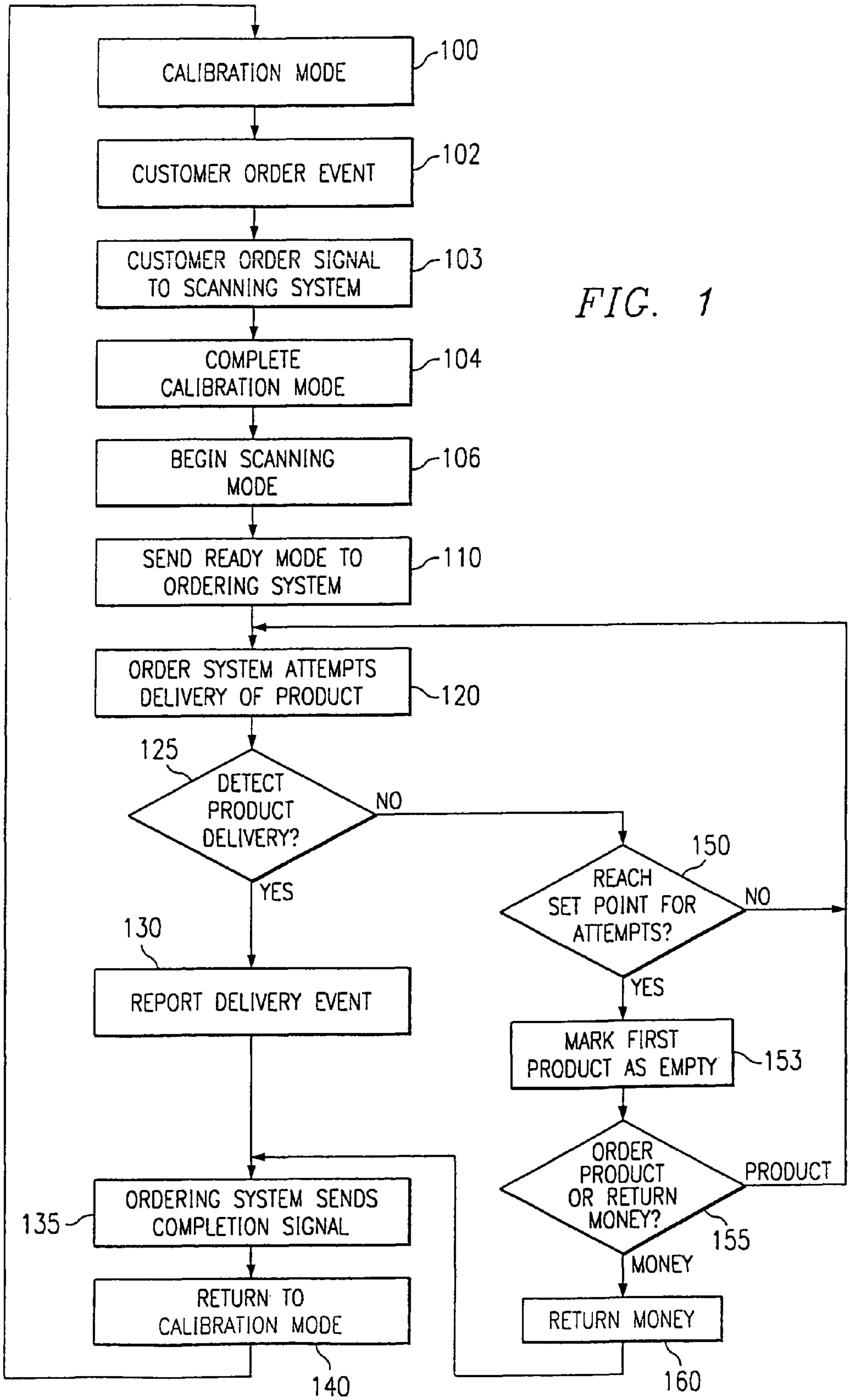
FIG. 1 is an overview of the methodology utilized in the present invention.

FIG. 1 is an overview of the methodology utilized in the present invention. The monitoring system is in calibration mode in its normal steady state configuration mode as shown in step 100. Calibration mode is discussed in greater detail in FIG. 5 below. The customer orders a product after placing money in the ordering system by depressing a keypad or similar device in step 102. The vending machine's ordering system sends a customer order event signal in step 103 to the monitoring system informing the sensing/monitoring system that an order event has occurred in step 102. The monitoring system subsequently completes its last calibration cycle in step 104 and transitions from steady state calibration mode to the monitoring cycle in step 106. Upon transitioning, the monitoring system commences its sensing/monitoring cycle by monitoring the product delivery path and sends a ready signal to the product delivery system in step 110. The monitoring cycle is described in more detail in FIG. 4, herein below. After receiving a ready signal from the monitoring system, the product delivery system attempts to deliver a product through the product delivery path in step 120. If the monitoring system senses or detects the product passing through the delivery path in step 125, it reports the delivery event to the ordering system in step 130. Upon receiving the report, the ordering system concludes the transaction with the customer and sends a completion signal to the monitoring system, which returns to steady state calibration mode in step 135, whereupon the monitoring system enters into calibration mode in step 140.

If the monitoring system does not detect a product in the first delivery attempt in step 125 then it will not send a signal to the ordering system after the step 125. The invention allows the delivery system to attempt delivery three times or a preset option. In step 150, if the number of attempted delivery cycles is less than the preset option, then the ordering system thereupon attempts to deliver the product again in step 120. If the attempted delivery cycles equal the preset option, then in step 155 the customer is granted alternatives to purchasing the first ordered product. Step 155 allows the customer to either ask for a refund or make a selection of a second, different product for delivery and step 153 marks the first ordered product as empty.

Step 153 prevents future vend attempts for the first ordered product until the vending machine is visited by a service person. This helps to prevent cheating by a customer if the vending machine reverts to the home switch operation, and helps to prevent further tampering if tampering was the cause of the first vend failure.

If the customer chooses a refund, then the present invention delivers a signal to make a refund, in step 160, whereupon a signal is sent to the monitoring system that the order is complete in step 135 and to the monitoring system to enter into steady state calibration mode in step 140. If the customer chooses a second, different product, then the present invention returns to 120 and the process proceeds as described above, until the operation is complete.

Figure 2:
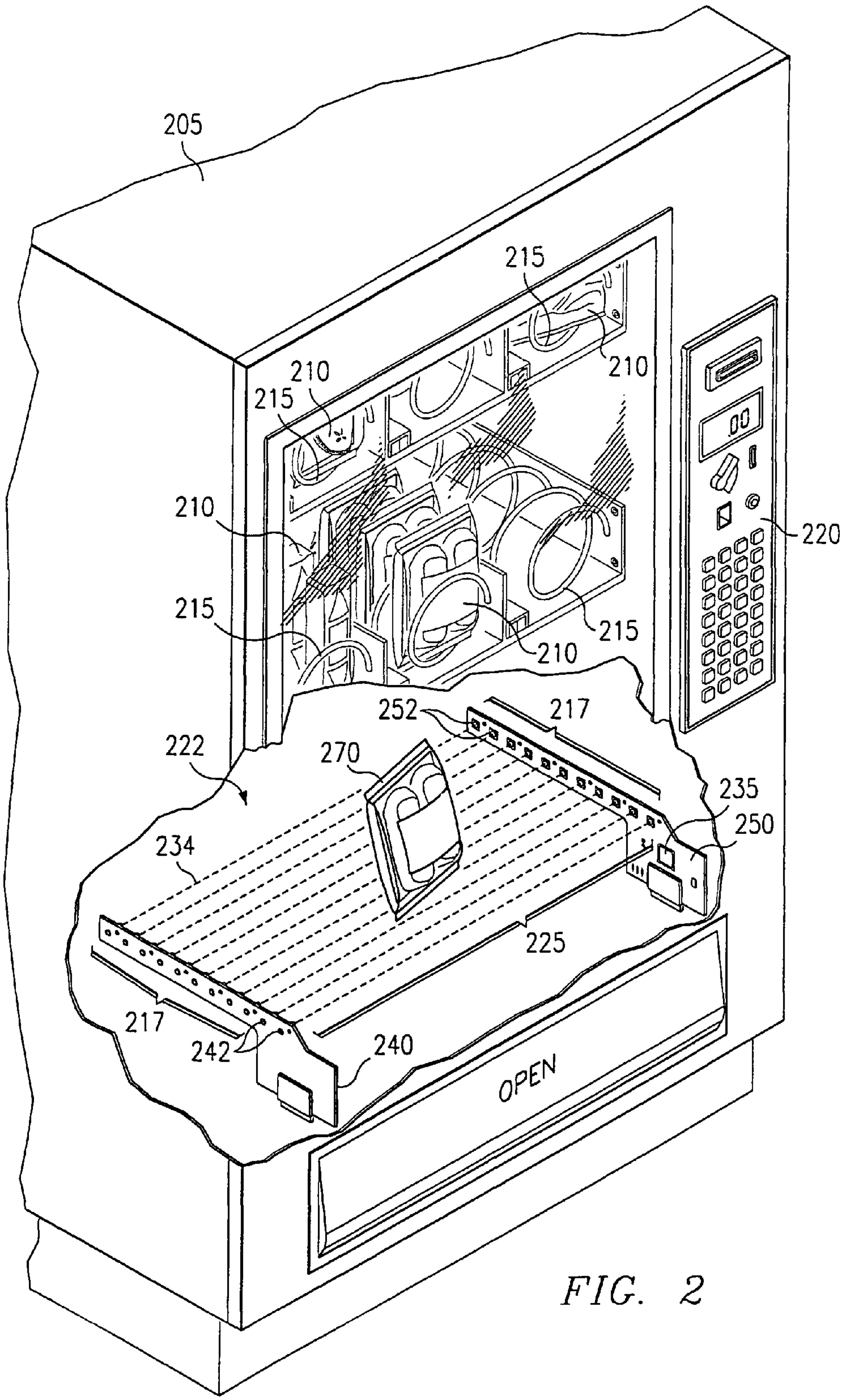
FIG. 2 shows a schematic diagram of the present invention.

FIG. 2 shows a schematic diagram of the present invention installed in a vending machine 205. In FIG. 2 various products 210 are placed in the vending machine's delivery system 215. Prior to a customer making a purchase, the monitoring system 217 is in calibration mode. When a customer makes an order through the order system 220, the monitoring system completes the calibration mode and enters into its monitoring mode. Thereupon, the ordering system allows for an attempted delivery of the ordered product 210, typically through a helical delivery system 215. When ordered, product 270 is delivered into delivery space 222, falling through the delivery path 225 past monitoring system 217. As it passes the monitoring system, the product momentarily breaks the continuity of the monitoring system's monitoring devices. If the monitoring system utilizes an optical monitoring system, then as the product passes through the monitoring system's light plane 234, be it infrared or otherwise, it momentarily breaks the light continuity and prevents a portion of the light from reaching at least one detector on the opposite side of the monitoring path. The logic circuit on the detecting arm 235 will note the momentary blockage of light and report it as a delivery event.

The monitoring system is comprised of an emitter arm 240 upon which are located a set number of one or more emitters 242, and a detector arm 250 comprising of one or more detectors 252 and located directly across delivery path 225 from the emitter arm 240. Emitter signals, the total of which comprise light plane 234, are sent from the emitters 242 to the detectors 252 across the delivery path 225 during both monitoring mode and calibration mode. The emitter arms and detector arms are described in more detail in FIGS. 3A and 3B.

Figure 3A:
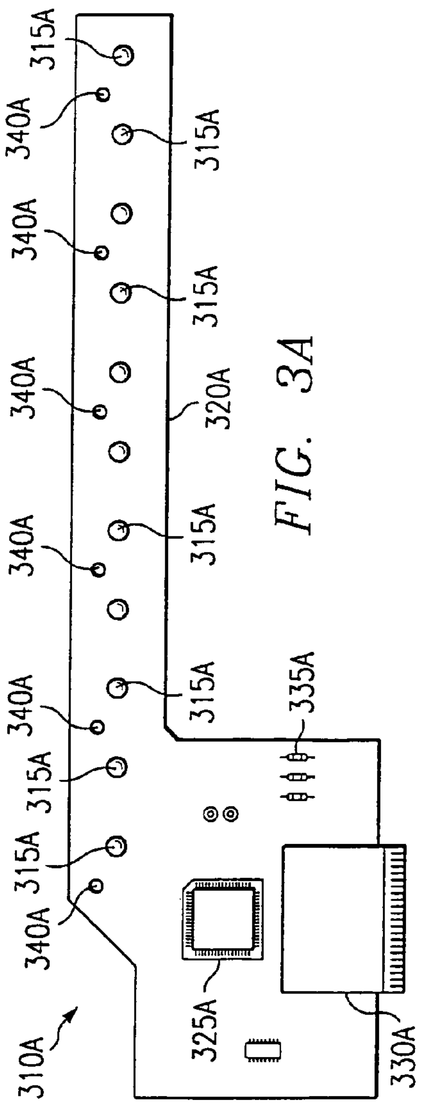
FIG. 3A shows the emitter arm portion of the monitoring system.

FIG. 3A shows the emitter arm portion of the monitoring system. In FIG. 3A, emitting arm 310A transverses along one side of the delivery path in the vending machine. Emitters 315A are attached to arm 310A. The horizontal and vertical placement of emitters 315A on arm 310A is determined by the size of the smallest product that crosses the delivery path, and by the type and accuracy of the emitters utilized in the present invention.

The emitters may comprise of an optical monitoring device. The spacing of optical emitters is determined by five factors: emitter size, optical diffusion, ambient light, product size and the reflected light. Emitter size and optical diffusion are fixed at the time of construction; however, ambient and reflective light may vary over the course of use of the emitter. Infrared light may be used to help to reduce these effects. However, it is clearly understood and contemplated by the present invention that other types of light sources can be used, including various lasers or white light sources.

The body 320A of the arm 310A is made of suitable material able to contain the electronic control components 325A necessary to operate the emitter, including, a power source 330A, and logic circuitry 335A. Additionally, holes 340A are provided to securely fasten and adjust the positioning of the arm 310A to the vending machine.

Figure 3B:
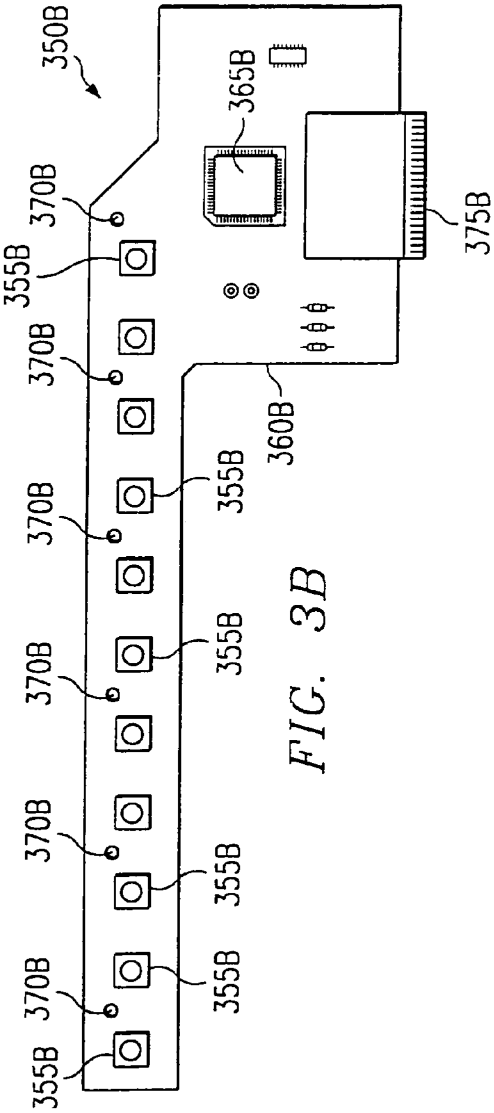
FIG. 3B shows the detector arm portion of the monitoring system.

FIG. 3B shows the detector arm portion of the monitoring system. The shape and construction of the detecting arm 350B is related to the shape and construction of the emitting arm 310A. The detecting arm 350B is placed on the same plane, parallel to and across the delivery path from arm 310A (see FIG. 2 for more details). The detectors 355B are arranged so that their vertical spacing and horizontal arrangement mirror the emitters' arrangement on arm 310A. Likewise, the body 360B of 350B is constructed of material suitable to contain detection and logic circuitry 365B, attachment holes 370B, and a power source 375B. The choice of the type of detector is directly related to the type of emitter being utilized in the present invention.

Figure 4:
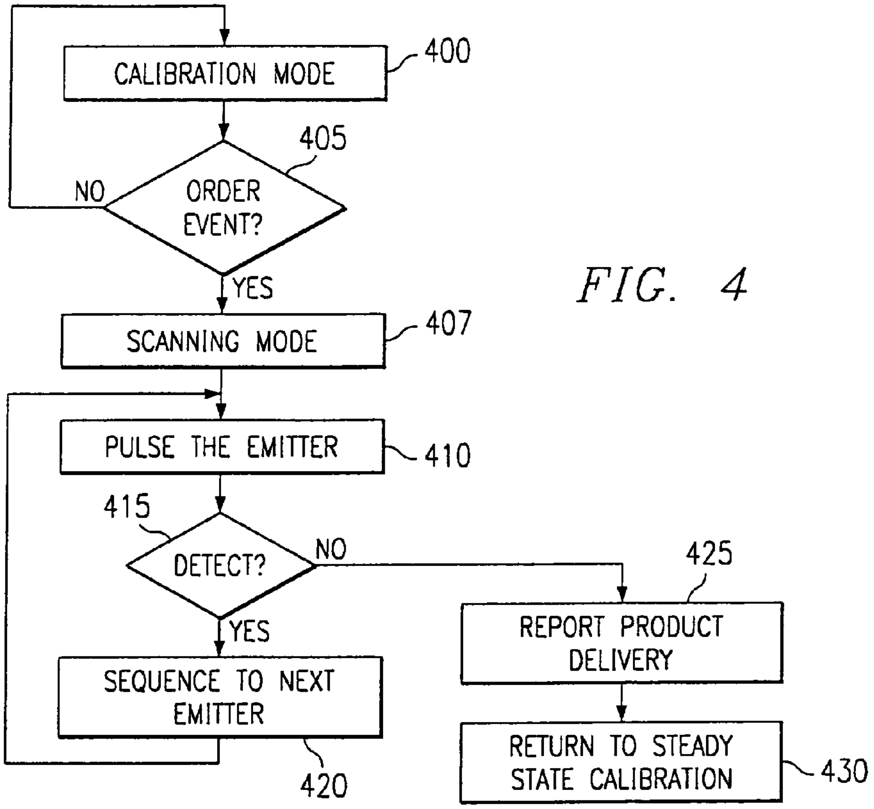
FIG. 4 shows the operation of the monitoring system when a customer places an order.

FIG. 4 shows the operation of the monitoring system when a customer places an order. Prior to placing an order, the monitoring system is in calibration mode in step 400. Upon placement of the order in step 405, the monitoring system transitions from its steady state calibration mode 400 into its monitoring mode in step 407. Once in monitoring mode, the monitoring system begins cycling each emitter by pulsing the emitter individually in step 410. The monitoring system uses a pulse strength determined from when the system was in the calibration mode.

In step 410 an emitter pulses its signal to the corresponding detector across from the emitter, and the two detectors on either side of the detector. Upon pulsing the light, the detector circuitry determines whether the detectors detected the light from the emitter in step 415. (If the emitter is either the first emitter or the last emitter on the emitter arm, then only the detector across from the emitter and the detector on the non-wall side of the detector is scanned.)

If the detector directly across from the pulsing emitter or the side detectors detects the signal in 415, then the emitter's logic circuit sequences to the next emitter in line and sends a pulse from that emitter in step 420. The emitter's logic circuit continues until after it completes the pulsing of the last detector whereupon, the monitoring system repeats the process, begins again at the first emitter until the detector's logic circuit receives a detect signal and the monitoring system receives a signal to cease monitoring.

If at least one of the three detectors fails to detect a light beam from the emitter during the monitoring cycle, then the logic circuit reports a product delivery to the ordering system in step 425. Once a report of delivery is made to the ordering system, the ordering system returns a signal to the monitoring system to return to steady state calibration mode in step 430. Otherwise, the monitoring system continues to monitor until it receives a return to steady state calibration signal from the ordering system because of a refund, if appropriate.

Figure 5:
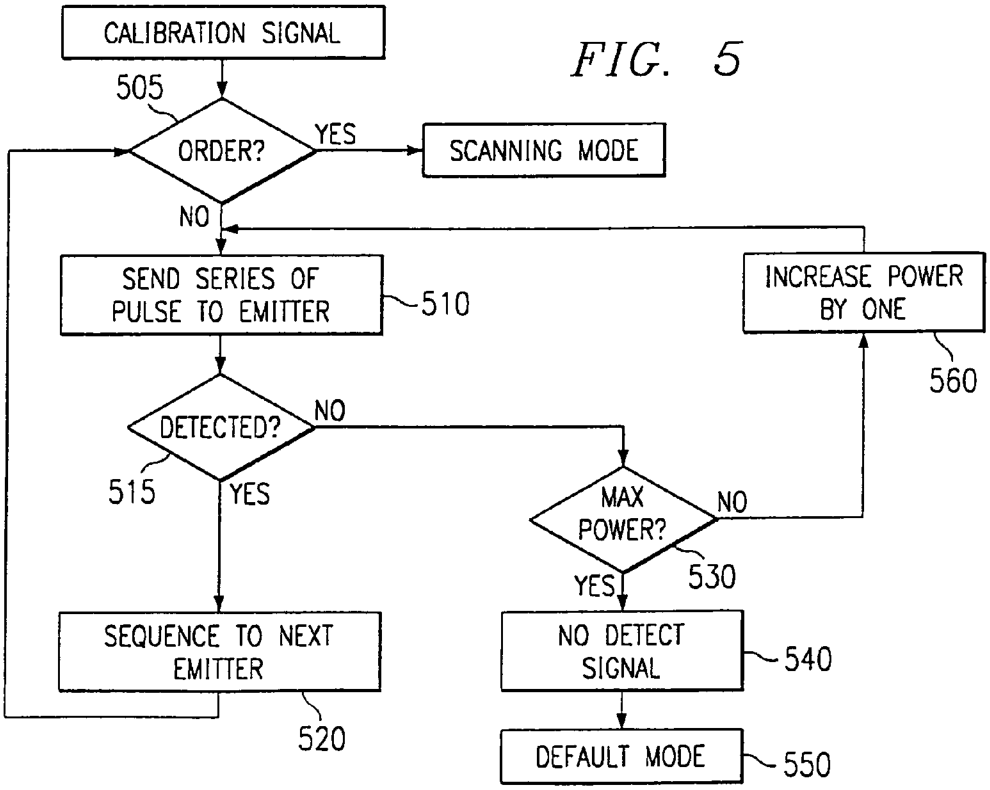
FIG. 5 shows the steady state calibration mode of the monitoring system.

FIG. 5 shows the steady state calibration mode of the monitoring system. During the steady state calibration mode, the monitoring system is constantly calibrating itself for optimum performance because temperature, humidity, dust, and alignment conditions fluctuate over the course of system usage.

The calibration mode adjusts the light intensity from each emitter as necessary so that each set of three detectors serviced by that emitter receives only enough intensity, plus a small safety margin, to be active in the unblocked condition.

This minimizes the adverse affects of reflected light from the emitters and allows for a wider detector aperture (which makes system alignment easier) and reduces the overall power requirements of the system. In step 505, the logic circuit in the monitoring system determines whether an order has been placed. If an order has not been placed, then the monitoring system proceeds to send a series of pulses to the first of the one or more emitters in step 510. Upon sending a pulse, the monitoring system queries the emitter's corresponding detector and each detector on either side of the corresponding detector to determine if those detectors detected the pulsed signal in step 515. If a signal was detected in each of the three detectors then the monitoring circuitry sequences to the next emitter in step 520. The emitters typically have adjustable signal power levels associated with the type of emitter used. The calibration mode will attempt to maintain the power level at the level needed to provide just enough signal, plus a safety margin, such that the corresponding detectors detect the signal. If any one of the three detectors does not detect the pulsed signal from the emitter, then in step 530, the monitoring circuitry determines whether the emitter is operating at its maximum power intensity. If the emitter is not, then the emitter will step increase the signal power level in step 560 and re-send a pulsed signal to the detectors again in step 510. If the power intensity for that emitter is at its maximum intensity, then the detector will send an error message to the monitoring system in step 540. The monitoring system will then follow a precoded routine to shut down the entire vending operation, shut down the monitoring system or rely on prior art ordering systems (the home switch method) in step 550.

Figure 6:
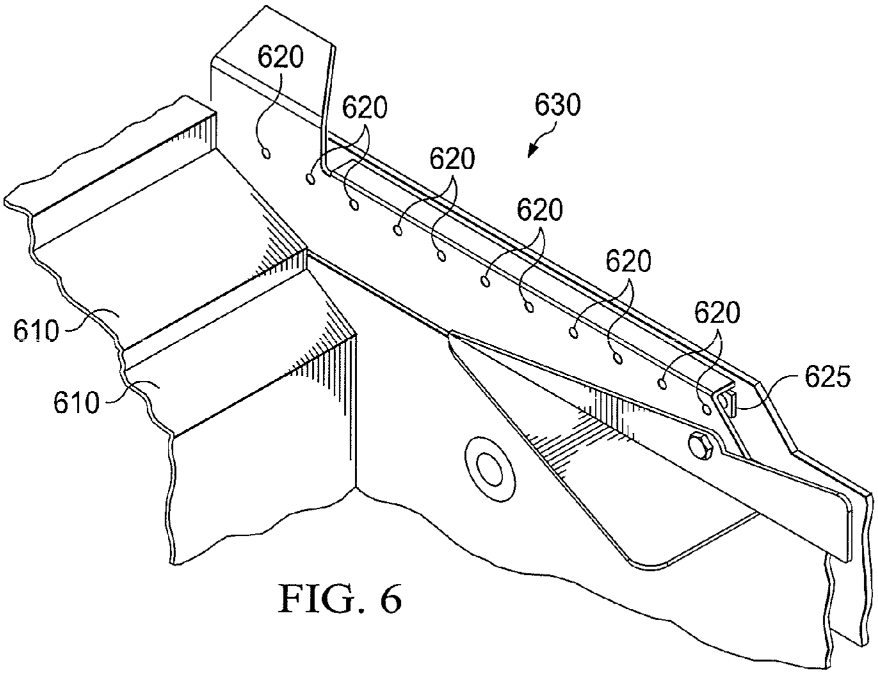
FIG. 6 shows a typical detector arm attached to a vending machine.

FIG. 6 shows a typical detector arm attached to a vending machine. Because of the reflective surfaces 610 in the vending machine, small apertures 620 are used to minimize the reflective light from adjacently reflective surfaces 610. The apertures are narrowed holes located in front of the detectors, 625, on the detector side of sensing system 630. The holes inhibit unwanted reflections from adjacent surfaces by blocking much of the light beams that reflect back to the detector arm at wider angles than the apertures allow.

Apertures 620 keep the majority of the unwanted light from reaching the detection side of the monitoring system. In addition, the detectors 625 have a usable 60 degree horizontal/30 degree vertical reception angle. Light arriving at the detector at angles greater than these is rejected. Additionally, infrared optical detectors contain optical frequency filters, which reject visible light frequencies, but pass the infrared frequencies of interest. Modulation techniques, whereby the detector only responds to certain signal frequencies from the infrared emitters, may also be used to allow the detectors to distinguish between the ambient light and the desired point source light frequency from the emitter.

As mentioned above, product detection may be accomplished by utilizing infrared emitter/detector pairs that can monitor and detect when a signal path is broken. In a typical vending machine's delivery paths, a set of ten infrared emitter/detector pairs are used to cover the delivery path much like a light curtain.

Figure 7:
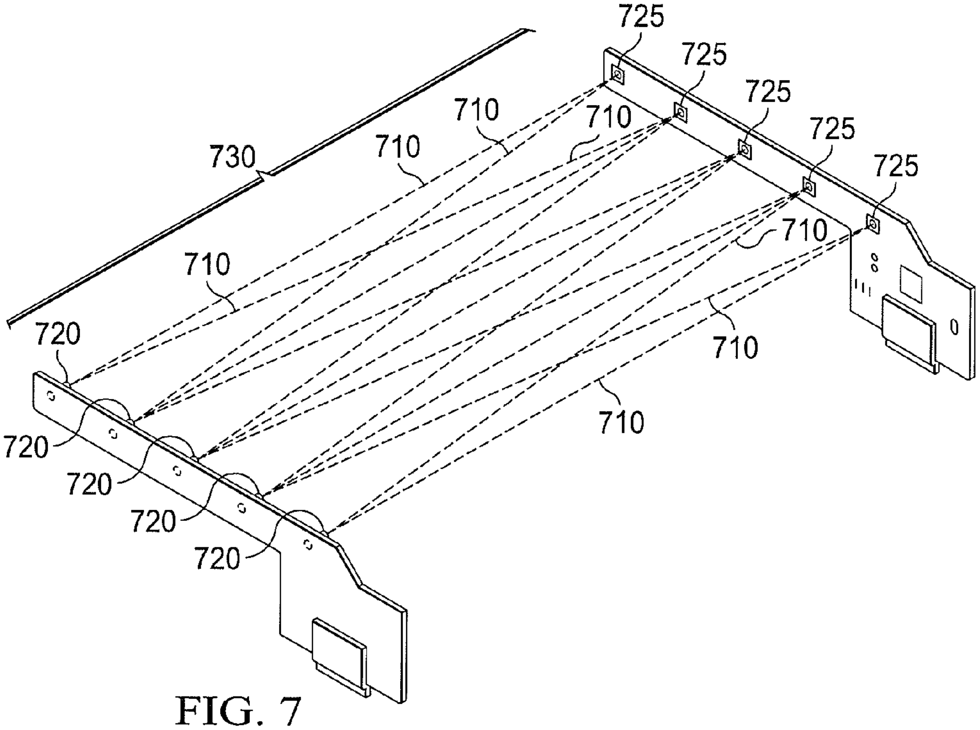
FIG. 7 shows light beam patterns for the emitters in the monitoring system.

FIG. 7 shows a representative example of a light curtain 730 that may be utilized in the present invention. Typically, nine sets of emitters/detectors are used to cover the main delivery path, while the tenth set is used to cover a gum/mint area. The nine sets that cover the main delivery path implement a technique, which, other than for the first and last emitter, requires that a minimum of three detectors are active for each individual emitter monitor cycle. For those vending machines without a gum or mint section, the tenth emitter may be used for the main delivery area, provided that proper alignment of the ten sets is taken into consideration.

This arrangement is illustrated in FIG. 7, which shows the light beams 710 of interest for each emitter 720 and detector 725. The spacing of the emitter/detector sets are chosen to assure that the smallest size traditional product breaks the path of at least one beam when it crosses the light curtain during delivery. The technique of servicing three detectors for each emitter allows the monitor to read multiple light beams, which further reduces this spacing in the majority of the delivery area. A logic circuit determines whether a light beam has been broken.

In the monitoring system, the infrared emitter/detector sets are controlled by a microcontroller located on the detector arm. During the monitoring mode, it is necessary to monitor each of the emitter/detector sets separately because of the potential for light bleed-over from adjacent emitters. The timing sequence for each set monitor cycle used during the monitoring mode must be fast enough to ensure that the smallest product will be detected by any one of the detectors when the product passes the monitor plane as it falls from the product storage area.

The control software further provides the vending operator an option to revert to home switch operation or to place the vending machine out of service in the event the monitoring system is inoperative. This allows the operator to choose one of two options if the monitoring system is operative: 1. to go out-of-service and thus assure that the customer is cheated since the monitoring system cannot determine proper delivery of a ordered product by home switch operation; or 2. to continue making selections available to the customer under the traditional home switch operation with the risks of non-proper delivery of product that operation implies.

The monitoring system controller printed circuit board uses flash memory to store the firmware. This gives the option to perform firmware updates in the field.

The vending system has several operating options. These may be viewed and programmed by pressing the PRODUCT CONFIG service key on the keypad located on the inside of the vending machine and pressing the down arrow until the appropriate option is reached. The keypad has an associated display device, such as an LED screen or such other typical devices that allow the operator to view the code and results stored within the system.

By depressing the EDIT key, the vendor can choose between "SURE.V ON" or "SURE.V OFF". "SURE.V OFF" is chosen by the operator only if the monitoring system is not installed or if the operator does not wish to use it at the present time. The remaining options for the PRODUCT CONFIG mode are only visible if "SURE.V ON" is selected and the monitoring system is available.

When "SURE.V ON" is selected, the operator may then choose between "OPT'N SURE.V" or "MUST SURE.V". If "OPT'N SURE.V" is selected, the vending machine operation reverts to home switch operation if the monitoring system is not operating normally because, for example, of an obstruction or loss of communication. If "MUST SURE.V" is selected by the operator, the vending machine operates only if the monitoring system is available for use for the main delivery area. (The gum and mint area does not affect operation of the main area, unless the programmer decides otherwise.) Otherwise, the vending machine becomes temporarily out-of-service until the blockage or other error is corrected.

When the operator uses the number keys to program "ANTI.JP xx", the anti-jackpot protection option against unforeseeable cheating of the vending machine's monitoring system is activated. "xx" represents the number of empty conditions that disables the entire delivery system for a time period as programmed and decided by the operator (described below). A empty condition occurs when product delivery is not detected and the customer's money is restored or returned. An "xx" value of "00" disables this anti-jackpot feature.

The assumption of this option is that very few system failures to the vending machine's delivery system occurs. If a significant number of failures, represented by "xx", do occur then it is assumed that it is because of tampering. Upon reading "xx", the delivery system is deactivated for a certain amount of time so that money can no longer be refunded because of a vend failure and to discourage a potential thief from attempting to steal either product or money.

In this condition, the vending machine either reverts to home switch operation if "OPT'N SURE.V" is active, or the system deactivates and the vending machine goes out of service if "MUST SURE.V" is active. If in "Must Sure.V", once the programmed deactivation time has elapsed the system is re-enabled and the count towards "xx" is restarted. The total number of system empty selections, the number of anti-jackpot occurrences, and the date and time of the last occurrence are recorded as noted below.

The operator programs the number of minutes that the vending system remains disabled because of an anti-jackpot occurrence by selecting the "AJP.TMR xxM" option where "xx" is the time in minutes. If "99" is programmed, then the system remains disabled until the main door closes at the end of the next service call. Closing the main door also resets any anti-jackpot time remaining.

Certain system data can be reviewed in the PRODUCT CONFIG mode:

"SV.EMPTY xx" returns the number of times that credit was restored or returned because the monitoring system failed to detect a product delivery.

"* *.SV xxxx" returns the total number of corrected vends, viewable by selection. These are the vends, which normally would not have delivered product if the present invention was not active.

"WO.SV xxxx" returns the number of vends, viewable by selection, made while the monitoring system was disabled for some reason.

The MACHINE CONFIG list provides additional options related to the present invention. If the operator selects "FAIL=CASH", the customer's money is automatically returned on any failed vend. If "FAIL=CRDT" is selected, the credit is restored to the vending machine for another selection. The customer may press the coin return to retrieve his money.

The TEST list provides the test screen for the system. If the operator keys in "SV.TST xxx" the following options are provided:

"SV.TST OK" indicates that the monitoring system is operating properly.

"SV.TST xx" indicates a block in sensing zone 1-9 with 1 being closest to the glass. "H" indicates the gum & mint is blocked if it is configured. This number is displayed real-time and beeps as it changes. This may be used to test the product coverage of the monitoring system's sensors, although the accuracy is somewhat less than in actual vend situations because of the data being presented.

"SV.TST CAL" indicates calibration values that are high.

"EDIT" may be used to view the calibration values. A high calibration may be caused by dirt, misalignment of the system sensors, or a partial blockage of a sensor.

A calibration value of "0" indicates a shorted detector. This normally requires a new detector assembly.

A calibration value of "1" indicates that zone could not be calibrated. It indicates a blocked or damaged sensor.

Calibration values above "A" are abnormal and may require adjustment of the alignment or cleaning of the sensors.

"SV.TST COMM" indicates loss of communication with the monitoring system, and allows the operation to check the harness connections between the vending machine controller and the monitoring system's controller. Diagnostics related to the present invention:

"SV.EMPTY nn" shows that selection "nn" was marked as empty because product delivery was not detected.

"SV.TST xx" automatically enters the system test screen as a diagnostic message if any blocked sensor, communication error, or calibration error is detected.

"AJP.TMR xx.xM" is in the diagnostic list if the anti-jackpot timer is active. It shows the time remaining.

"AJP xxX MN/DY HR.MN" is the total number of times the anti-jackpot feature occurred plus the date and time of the last occurrence.

What is claimed is:

1. An optical sensing system, comprising:

a row of light emitters on a first side of a region through which a product falls during delivery and a row of light detectors on a second side of the region, each light detector substantially aligned with a corresponding one of the light emitters, each light emitter, when activated, emitting light across the region and directly incident upon at least one of the light detectors, each light detector substantially aligned with a corresponding one of the light emitters, each light detector detecting light emitted from any of two or more of the light emitters when the respective light emitter is activated;

an optical detection aperture located in front of each light detector and between the respective light detector and the light emitters, each optical detection aperture constraining a range of incident angles of light that may be detected by the respective detector and allowing light from a larger range of horizontal angles to reach a respective light detector than light from a range of vertical angles that reaches the respective light detector to permit direct light from the light emitters to reach the light detectors while blocking light from the light emitters reflected from adjacent reflective surfaces;

a controller sequentially activating each one of the light emitters on the first side of the region through which the product falls for a first period of time then deactivating the one of the light emitters and, for each light emitter when activated, monitoring at least two light detectors for detection of light from the activated light emitter when the activated emitter is an end emitter within the row of emitters and monitoring at least three light detectors for detection of light from the activated light emitter when the activated emitter is not an end emitter within the row of light emitters; and a reporting circuit coupled to the light detectors and, responsive to detection of light from the activated light emitter at fewer than all of the at least two monitored light detectors, generating a signal indicating delivery of a product.

2. The optical sensing system of claim 1, wherein the light detectors include optical frequency filters.

3. The optical sensing system of claim 1, wherein the row of light detectors is a fixed distance across the region from the row of light emitters.

4. An optical sensing system, comprising:

a row of light emitters on a first side of a region through which a product falls during delivery, each light emitter, when activated, emitting light across the region;

a row of light detectors on a second side of the region, each light detector substantially aligned with a corresponding one of the light emitters and configured to function as a point detector for direct point-to-point beams between the emitters and detectors, each detector positioned behind an optical aperture between the respective detector and the light emitters, the optical aperture constraining a range of incident angles of light that may be detected by the respective detector, each detector having a horizontal reception angle greater than a vertical reception angle and selected to allow detection of the direct point-to-point beams without interference from reflected light from the light emitters;

a controller individually activating each one of the light emitters for a first period of time and, for each light emitter when activated, monitoring at least two light detectors for detection of light from the activated light emitter when the activated emitter is an end emitter within the row of emitters and monitoring at least three light detectors for detection of light from the activated light emitter when the activated emitter is not an end emitter within the row of light emitters, wherein each light emitter, when activated, emits light including a plurality of detectible beams each extending between the activated light emitter and one of the monitored light detectors, and wherein product passage through the region is detected by interruption of one or more of the detectible beams; and a reporting circuit coupled to the light detectors and, responsive to detection of light from the activated light emitter at fewer than all of the at least two monitored light detectors, generating a signal indicating delivery of a product.

5. An optical sensing system, comprising:

a row of light emitters on a first side of a first region through which a product falls during delivery, each light emitter emitting light across the first region;

a row of light detectors on a second side of the first region, each light detector substantially aligned with a corresponding one of the light emitters, the row of light detectors being across the first region from the row of light emitters with each detector positioned behind an optical aperture between the respective detector and the light emitters, the optical aperture constraining a range of incident angles of light that may be detected by the respective detector to block light beams from the light emitters reflected from adjacent reflective surfaces;

a controller individually activating each one of the light emitters for a first period of time, wherein, for each light emitter when activated, the controller monitors at least two light detectors for detection of light from the activated light emitter when the activated emitter is an end emitter within the row of emitters and monitoring at least three light detectors for detection of light from the activated light emitter when the activated emitter is not an end emitter within the row of light emitters, wherein the light emitters are sequentially activated in round-robin fashion; and a reporting circuit coupled to the light detectors and generating a signal indicating delivery of a product in response to detection of light from the activated light emitter at fewer than all of the at least two monitored light detectors.

6. An optical sensing system, comprising:

a row of light emitters on a first side of a region through which a product falls during delivery, each light emitter emitting light across the region;

a row of light detectors on a second side of the region, each light detector substantially aligned with a corresponding one of the light emitters, the row of light detectors being across the first region from the row of light emitters with each detector positioned behind an optical aperture between the respective detector and the light emitters, the optical aperture constraining a range of incident angles of light that may be detected by the respective detector;

a controller individually activating each one of the light emitters for a first period of time and, for each light emitter when activated, monitoring at least two light detectors for detection of light from the activated light emitter when the activated emitter is an end emitter within the row of emitters and monitoring at least three light detectors for detection of light from the activated light emitter when the activated emitter is not an end emitter within the row of light emitters; and a reporting circuit coupled to the light detectors and, responsive to detection of light at fewer than all of the at least two monitored light detectors, generating a signal indicating delivery of a product.

7. A vending machine including an optical sensing system, the optical sensing system comprising:

a row of light emitters on a first side of a region through which a product falls during delivery and a row of light detectors on a second side of the region, each light emitter, when activated, emitting light across the region and directly incident upon at least one of the light detectors, each light detector substantially aligned with a corresponding one of the light emitters, each detector positioned behind an optical aperture between the respective detector and the light emitters, the optical aperture constraining a range of incident angles of light that may be detected by the respective detector, each light detector detecting light emitted from any of two or more of the light emitters when the respective light emitter is activated, wherein obstruction of one of a plurality of direct point-to-point beams between the light emitters and light detectors is detected despite reflection of light from the light emitters off adjacent reflective surfaces;

a controller sequentially activating for a first period of time then deactivating each one of the light emitters on the first side of the region through which the product falls and, for each light emitter when activated, monitoring at least two light detectors for detection of light from the activated light emitter when the activated emitter is an end emitter within the row of emitters and monitoring at least three light detectors for detection of light from the activated light emitter when the activated emitter is not an end emitter within the row of light emitters; and a reporting circuit coupled to the light detectors and, responsive to detection of light from the activated light emitter at fewer than all of the at least two monitored light detectors, generating a signal indicating delivery of a product, wherein the row of light emitters and the row of light detectors are positioned between a lowest set of product storage locations within the vending machine and a delivery bin.

8. An optical sensing system for use in a vending machine, comprising:

a row of three or more light emitters on a first side of a region through which a product falls during delivery and a row of three or more light detectors on a second side of the region, each light detector substantially aligned with a corresponding one of the light emitters, the row of light emitters and the row of light detectors configured to be positioned between a lowest set of product storage locations within the vending machine and a delivery bin, each light emitter, when activated, emitting light across the region onto a plurality of the detectors, wherein the emitted light includes a plurality of columnar beams individually detectible by at least one of the detectors and wherein interruption of one of the columnar beams between one of the emitters and any of a plurality of the detectors is detected despite reflection of light from the light emitters off adjacent reflective surfaces, each detector positioned behind an optical aperture between the respective detector and the light emitters, the optical aperture constraining a range of incident angles of light that may be detected by the respective detector;

each light detector substantially aligned with a corresponding one of the light emitters, each light detector capable of detecting light emitted from any of two or more of the light emitters when the respective light emitter is activated when the activated emitter is an end emitter within the row of emitters and monitoring at least three light detectors for detection of light from the activated light emitter when the activated emitter is not an end emitter within the row of light emitters;

a controller sequentially activating for a first period of time then deactivating each one of the light emitters on the first side of the region through which the product falls and, for each light emitter when activated, utilizing an output from at least two light detectors in determining whether light from the activated light emitter was interrupted; and a reporting circuit coupled to the light detectors and, responsive to detection of light at fewer than all of the at least two light detectors, generating a signal indicating delivery of a product.

9. A vending machine including the optical sensing system of claim 8.

10. An optical sensing system, comprising:

a row of sequentially activated then deactivated light emitters on a first side of a region through which a product falls during delivery and a row of individually monitored light detectors on a second side of the region, each light emitter, when activated, emitting light across the region onto a plurality of the light detectors, each light detector substantially aligned with a corresponding one of the light emitters, each light detector detecting light emitted from the aligned light emitter when the aligned light emitter is activated and separately detecting light emitted from an emitter adjacent within the row to the aligned light emitter when the adjacent light emitter is activated, wherein two or more light detectors are monitored for light from each light emitter when the respective light emitter is activated to detect interruption of any of a plurality of direct point-to-point beams between the activated emitter and any of the two or more detectors despite reflection of light from the light emitters off adjacent reflective surfaces, each detector positioned behind an optical aperture between the respective detector and the light emitters, the optical aperture constraining a range of incident angles of light that may be detected by the respective detector;

a controller individually activating each one of the light emitters for a first period of time and, for each light emitter when activated, monitoring at least two light detectors for detection of light from the activated light emitter when the activated emitter is an end emitter within the row of emitters and monitoring at least three light detectors for detection of light from the activated light emitter when the activated emitter is not an end emitter within the row of light emitters; and a calibration controller setting an intensity of light emitted from the light emitters based upon a minimum level sufficient to ensure detection of light from the activated light emitter by all of the monitored light detectors.

11. The optical sensing system according to claim 10 wherein the calibration controller, upon failure of any monitored light detector to detect light from an activated light emitter, attempts to increase a power applied to the activated light emitter.

12. The optical sensing system according to claim 11 wherein the calibration controller, upon failure of any monitored light detector to detect light from an activated light emitter, determines whether a maximum power was applied to the activated light emitter.

13. The optical sensing system according to claim 11 wherein the calibration controller increases power applied to the activated light emitter by steps.

14. The optical sensing system of claim 10, wherein the light detectors include optical frequency filters.

15. The optical sensing system of claim 10, further comprising:

optical detection apertures located in front of each light detector, each optical detection aperture allowing light from a larger range of horizontal angles to reach a respective light detector than light from a range of vertical angles that reaches the respective light detector.

16. A vending machine including the optical sensing system of claim 10, wherein the row of light emitters and the row of light detectors are positioned between a lowest set of product storage locations within the vending machine and a delivery bin.

* * * * *